US010584586B1

(12) United States Patent
Floyd, Jr. et al.

(10) Patent No.: US 10,584,586 B1
(45) Date of Patent: Mar. 10, 2020

(54) PLUNGER AND CYLINDER ASSEMBLY FOR A RECIPROCATING PUMP

(71) Applicant: SOUTHERN STIMULATION TECHNOLOGIES, LLC, Tomball, TX (US)

(72) Inventors: Ilo Ray Floyd, Jr., Houston, TX (US); Robert Lee McPheron, IV, Tomball, TX (US); Chad Alan Hawkins, Tomball, TX (US)

(73) Assignee: SOUTHERN STIMULATION TECHNOLOGIES, LLC, Tomball, TX (US)

( * ) Notice: Subject to any disclaimer, the term of this patent is extended or adjusted under 35 U.S.C. 154(b) by 3 days.

(21) Appl. No.: 16/101,852

(22) Filed: Aug. 13, 2018

Related U.S. Application Data

(63) Continuation of application No. 15/890,237, filed on Feb. 6, 2018, now Pat. No. 10,077,659.

(51) Int. Cl.
| | | |
|---|---|---|
| *F01B 15/02* | (2006.01) | |
| *F04B 39/00* | (2006.01) | |
| *F16J 1/10* | (2006.01) | |
| *F16J 1/08* | (2006.01) | |
| *F04C 9/00* | (2006.01) | |

(52) U.S. Cl.
CPC .......... *F01B 15/02* (2013.01); *F04B 39/0005* (2013.01); *F16J 1/10* (2013.01); *F04C 9/00* (2013.01); *F16J 1/08* (2013.01)

(58) Field of Classification Search
CPC .... F01B 15/02; F04B 39/0005; F04B 19/022; F16J 1/10; F16J 1/08; F04C 9/00
See application file for complete search history.

(56) References Cited

U.S. PATENT DOCUMENTS

| | | | | |
|---|---|---|---|---|
| 8,707,853 B1* | 4/2014 | Dille | ................ | F04B 53/14 92/165 R |
| 8,784,081 B1* | 7/2014 | Blume | ................ | F04B 53/16 417/559 |
| 2011/0142699 A1* | 6/2011 | Pacht | ................ | F04B 53/147 417/437 |
| 2014/0322050 A1* | 10/2014 | Marette | ................ | F04B 47/02 417/437 |
| 2015/0132157 A1* | 5/2015 | Whaley | ................ | F04B 53/14 417/321 |

* cited by examiner

*Primary Examiner* — Thomas E Lazo
(74) *Attorney, Agent, or Firm* — Rao DeBoer Osterrieder, PLLC; Dileep P. Rao

(57) ABSTRACT

A plunger and cylinder assembly for the fluid end of a reciprocating pump. The assembly comprises a traveling cylinder, a stationary plunger, and an optional sleeve secured to the traveling cylinder in a detachable manner. The traveling cylinder is displaced along its axis by a thrust component and acts cooperatively with the stationary plunger to create a pressure change in the reciprocating pump.

13 Claims, 3 Drawing Sheets

PLUNGER AND CYLINDER ASSEMBLY FOR A RECIPROCATING PUMP

CROSS REFERENCE TO RELATED APPLICATION

The current application is a Continuation and claims priority to and the benefit of co-pending application Ser. No. 15/890,237 filed on Feb. 6, 2018, Titled "PLUNGER AND CYLINDER ASSEMBLY FOR A RECIPROCATING PUMP". This reference is hereby incorporated in its entirety.

FIELD

The present disclosure generally relates to a plunger and cylinder assembly for a fluid end of a reciprocating pump.

BACKGROUND

Reciprocating pumps are positive displacement pumps used in applications requiring high pressure or head at relatively low flow volumes when compared to other types of pumps.

One typical type of reciprocating pump employs a plunger or a piston to create a suction to draw in fluid, as well as discharge the fluid. The plunger or piston is thrust axially back and forth by a power source, such as a motor with a crankshaft on a cam arrangement. The change in volume caused by the movement of the plunger or piston creates suction and discharge pressures to pump fluids.

In industrial applications, it is often necessary or desirable to change the volume of fluid pumped, or the pressure at which a fluid is pumped. Often, due to the nature of the applications that reciprocating pumps are employed in, the pumps are very large and heavy. Maintenance, service, repairs, or any change to the configuration these pumps requires the use of cranes and/or other heavy equipment. Reciprocating pumps as a class typically require more maintenance and repairs as compared to other types of pumps (e.g. centrifugal pumps). In addition, modification to these pumps in any manner is very time and labor intensive.

The pumps are typically referred to as comprising two main components, a power end and a fluid end. The power end can have the motor and cam arrangement to supply thrust. The fluid end can have various sizes of plungers or pistons, Often, a power end will be utilized with various fluid ends, or plungers or pistons can be changed within a given fluid end.

Changing fluid ends requires users to maintain costly equipment (multiple fluid ends with various sized pistons or plungers) which take up significant space.

Changing the size of the plunger or piston used within a fluid end is a labor, time and resource intensive process. The fluid end must be detached from the power end. Often, the fluid end is transported to a maintenance shop or service facility. The piston or plunger must be removed and replaced. Modification of the fluid end often requires heavy lifting equipment, such as cranes and forklifts. This process can take from hours to days depending on the specific application.

It is desirable therefore, to have an inexpensive way to adjust pump properties without detaching the fluid end from the power end. It is also desirable to have a plurality of plunger or piston sizes to choose from in order to quickly and easily adjust flow and pressure parameters of a reciprocating pump.

The present disclosure addresses the above needs.

BRIEF DESCRIPTION OF THE DRAWINGS

The detailed description will be better understood in conjunction with the accompanying drawings as follows.

Figure 1:
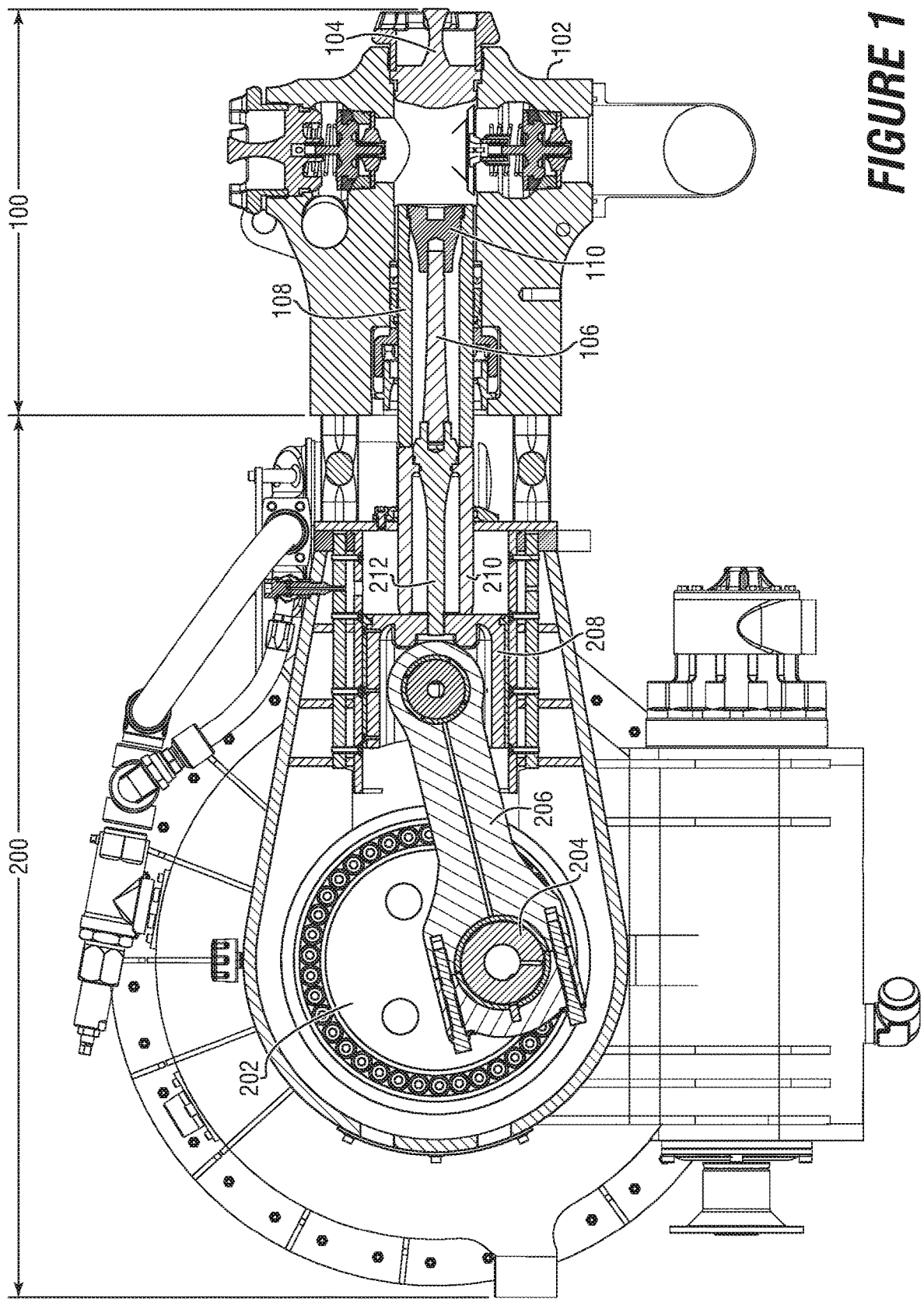
FIG. 1 depicts a typical prior art reciprocating pump.

The embodiments of the present disclosure are detailed below with reference to the listed Figures.

DETAILED DESCRIPTION OF THE EMBODIMENTS

Before explaining the present invention in detail, it is to be understood that the invention is not limited to the specifics of particular embodiments as described and that it can be practiced, constructed, or carried out in various ways.

While embodiments of the disclosure have been shown and described, modifications thereof can be made by one skilled in the art without departing from the spirit and teachings of the disclosure. The embodiments described herein are exemplary only and are not intended to be limiting.

Specific structural and functional details disclosed herein are not to be interpreted as limiting, but merely as a basis of the claims and as a representative basis for teaching persons having ordinary skill in the art to variously employ the present invention. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The use of the word "a" or "an" when used in conjunction with the term "comprising" in the claims and/or the specification may mean "one," but it is also consistent with the meaning of "one or more," "at least one," and "one or more than one."

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description herein, but is only limited by the claims which follow, encompassing all equivalents of the subject matter of the claims. Each and every claim is hereby incorporated into the specification as an embodiment of the present disclosure. Thus, the claims are a further description and are an addition to the embodiments of the present disclosure.

The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

The embodiments of the present disclosure generally relate to a plunger and cylinder assembly for a fluid end of a reciprocating pump.

A piston or a plunger work in conjunction with a cylinder to displace a fluid within a volume. In industry (especially in oil and gas applications), the term piston is typically used in reference to a reciprocating member which is dynamically sealed, and the term plunger is typically used in reference to a reciprocating member which is not. For the purposes of this disclosure, the terms "piston" and "plunger" will be utilized to mean either a piston or a plunger (as defined above) interchangeably. As will become evident to persons having ordinary skill in the art, the present disclosure is equally applicable to both piston and plunger style reciprocating pumps.

Components which are described as concentric shall refer to components with any shape that share the same geometric center in cross section. While typically circular cross sections are shown for clarity, the disclosure is not intended to be limited to circularly concentric shapes, and shall also refer to oval, elliptical, polygonal, or irregularly shaped cross sections.

The present disclosure relates to a plunger and cylinder assembly for the fluid end of a reciprocating pump. The novel arrangement of the components reverses the prior art cylinder and piston locations. This allows the cylinder to become the dynamic component, while the piston becomes the stationary component. This in turn allows for rapid adjustment of piston sizes by utilizing a sleeve without the need to disconnect the cylinder and/or fluid end of a pump from the power end.

The assembly comprises a traveling cylinder, a stationary plunger comprising a plunger shaft and a plunger head, and a sleeve detachably secured to the traveling cylinder.

The traveling cylinder is securable to a thrust component of a power end. A typical power end arrangement is a motor with a cam and a crankshaft with a connecting mechanism to the fluid end. The traveling cylinder can receive reciprocal thrust from the thrust component of the power end. The traveling cylinder can be secured to the thrust component by any means known to persons having ordinary skill in the art. In embodiments, the traveling cylinder can be clamped to the thrust component, or threaded to the thrust component using a cap.

Optionally, the sleeve can be secured to the traveling cylinder. The thickness of the sleeve can serve to decrease the inner diameter available for the stationary plunger to be inserted. In embodiments, the sleeve can be threaded on to the traveling cylinder. In other embodiments, attachments known to persons having ordinary skill in the art can be employed, such as snap rings, locking slots, o-rings, and the like.

While it is desirable for a sleeve to be utilized in order to allow for rapid changes of configuration, in embodiments in which the sleeve is not utilized, the stationary plunger can cooperate with the traveling cylinder in the manner described below.

A stationary plunger can be placed concentrically within the sleeve and the traveling cylinder. In embodiments, the stationary plunger can be secured to the fluid end of a pump. The stationary plunger can have a plunger shaft and a plunger head. The plunger head can be the portion of the stationary plunger that fits snugly within the sleeve.

In embodiments, the plunger head and shaft can be formed as one integral piece, or the plunger head made to be detachable from the plunger shaft to allow for various sizes of plunger heads to be used with a given plunger shaft. Similarly, this allows for various sizes of plunger shafts to be used with a given plunger head.

The plunger shaft can be of any diameter equal to or less than the diameter of the plunger head. The ratio of the diameter of the plunger shaft to the diameter of the plunger head can be adjusted for the desired volume of displacement of the plunger and cylinder assembly.

The contact area between the plunger head and the sleeve can form a seal, and the sleeve and the plunger head can act cooperatively to create a change in pressure within the fluid end of the reciprocating pump when the traveling cylinder is displaced. In embodiments, the stationary plunger can comprise a fluid pathway for lubrication of the seal formed by the contact area.

It should be readily apparent to persons having ordinary skill in the art that any given cross-sectional shape of the cylinder can be utilized, as long as plunger head has a matching cross-sectional shape. In other words, the outer diameter of the plunger head is substantially identical to the inner diameter of the sleeve in any given radial plane.

In embodiments, the stationary plunger can be detachable from the fluid end of the reciprocating pump without detaching the traveling cylinder from the thrust component of the power end. Further, the sleeve can be detached from the traveling cylinder without detaching the traveling cylinder from the thrust component.

In embodiments, the sleeve can have an inner diameter ranging from 0.25 inches to 8.00 inches and the plunger head can have an outer diameter ranging from 0.25 inches to 8.00 inches.

The present disclosure allows for easy retrofitting of existing reciprocating pumps. The method of retrofitting a reciprocating pump can comprise the steps of: removing a plunger from a reciprocating pump fluid end and replacing the plunger with a traveling cylinder, securing a sleeve with a desired inner diameter to the traveling cylinder, and removing a cylinder head plug from the reciprocating pump fluid end and replacing the cylinder head plug with a stationary plunger comprising a plunger head with an outer diameter to match the inner diameter of the sleeve.

The present disclosure allows for optimization of reciprocating pump performance. The method of optimizing reciprocating pump performance can comprise the steps of: providing a reciprocating pump fluid end comprising a traveling cylinder, an optional sleeve, and a stationary plunger, detaching and removing the stationary plunger, detaching and removing a sleeve, if used from the traveling cylinder, attaching a selected sleeve with a desired inner diameter for desired performance characteristics, selecting and attaching the stationary plunger comprising a plunger head with a matching outer diameter for the selected sleeve or, alternatively, replacing the plunger head of the stationary plunger with a plunger head having a matching outer diameter for the selected sleeve and attaching the stationary plunger.

In embodiments, the method can further comprise: varying the speed of a driver of the reciprocating pump fluid end for desired performance characteristics.

Turning now to the Figures, FIG. 1 depicts a typical prior art reciprocating pump.

Shown here are a power end 200 and a fluid end 100.

The power end 200 can have a drive 202, such as a motor and cam as shown. The drive can be connected to a crankshaft 204. One end of a connecting link 206 can be connected to the crankshaft 204 and the other end connected to a crosshead block 208. The crosshead block 208 can be connected to a pony rod 210 and a pony tie rod 212. This arrangement can cooperatively provide reciprocal thrust to the fluid end 100.

The fluid end 100 can comprise a housing 102 secured to the power end 200. The housing can contain the various valves for suction and discharge, as well as other common components of the reciprocating pump. As these elements are not relevant to the present disclosure, they will not be discussed and persons having ordinary skill in the art will be familiar with various arrangements utilized.

The fluid end 100 can comprise a plunger 108 having a piston tie rod 106 and a piston rod cap 110. The piston tie rod 106 can be secured to the pony tie rod 212 to receive reciprocal thrust from the power end 200. A cylinder head plug 104 can seal the housing 102.

As is apparent, the reciprocating movement of the plunger 108 pumps fluid through the fluid end 100. Further, changing the size of the plunger 108 requires the plunger 108 and its components to be disconnected for the components of the power end 200. Typically, the fluid end 100 is completely disconnected from the power end 200 in order to change out the plunger 108 or perform maintenance on the components of the plunger 108

Figure 2:
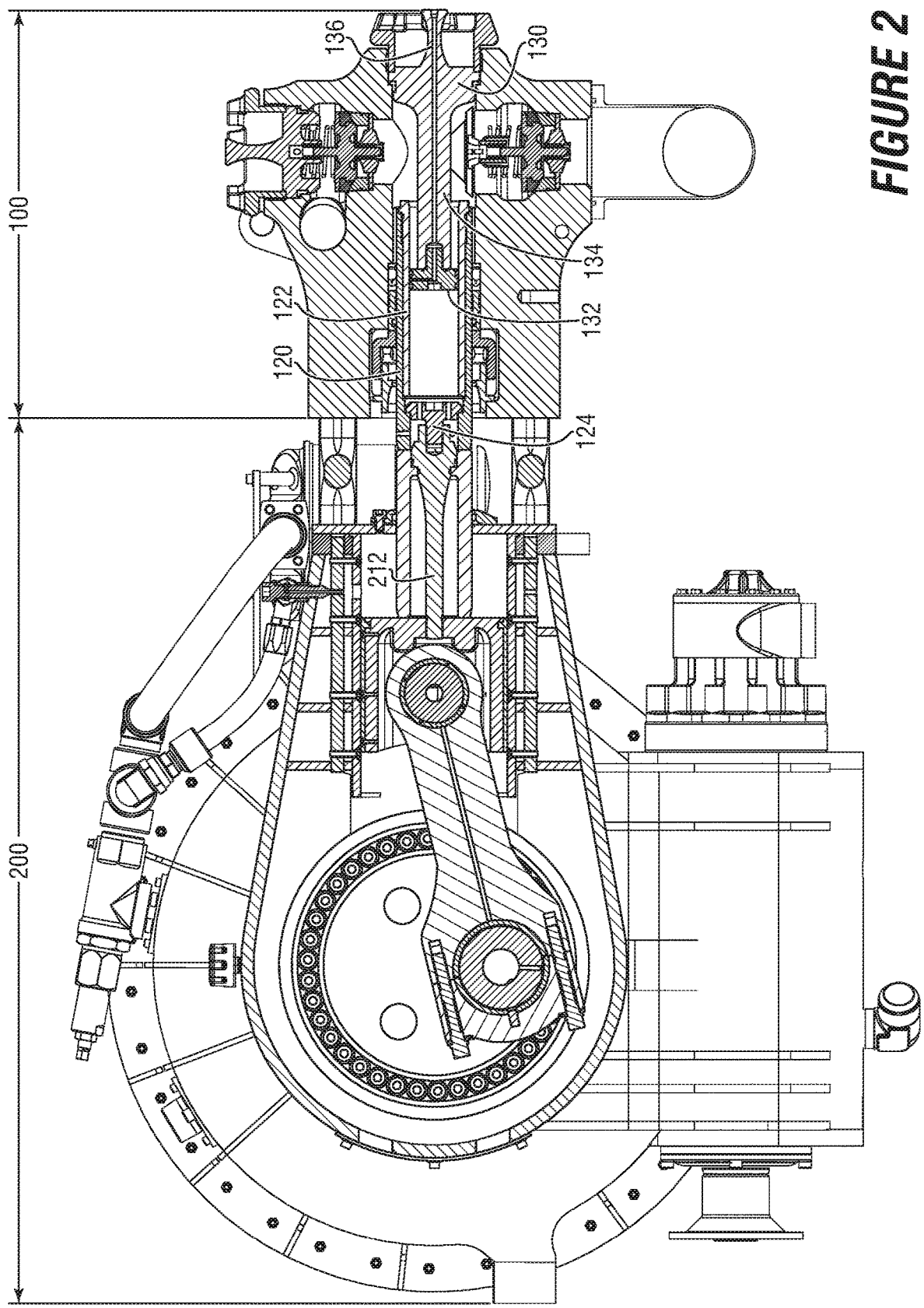
FIG. 2 depicts a reciprocating pump with the presently disclosed assembly according to one or more embodiments.

FIG. 2 depicts a reciprocating pump with the presently disclosed assembly according to one or more embodiments.

As is readily apparent by comparison to FIG. 1, no changes in the components of the power end 200 or the fluid end 100 aside from replacement of the respective parts are necessary to implement the assembly of the present disclosure.

Upon removal of the prior art plunger assembly, a traveling cylinder 120 can be secured to the pony tie rod 212. In embodiments, the traveling cylinder 120 can be clamped or secured with a tie rod cap 124 as shown. Stationary plunger 130 can be secured to the fluid end 100 and positioned concentrically within the traveling cylinder 120. Sleeve 122 can be used to adjust the inner diameter of the traveling cylinder 120. Stationary plunger can have a plunger head 132 and a plunger shaft 134. The plunger head can fit snugly within the sleeve 122, if used, or the traveling cylinder 120.

The reciprocating action of the traveling cylinder 120 can pump fluid from the fluid end 100. Stationary plunger can also comprise a fluid pathway 136 for lubricating a seal formed by a contact area of plunger head 132.

In embodiments, the plunger head 132 is removable from the plunger shaft 134. In other embodiments, the plunger head 132 and the plunger shaft 134 are formed as a single piece. Stationary plunger 130 can be attached and secured to the fluid end 100 in the same manner and location as the cylinder head plug 104 in FIG. 1.

As is evident by comparing the above Figures, replacing the stationary plunger 130 with the cylinder head plug 104 and capping the end of the traveling cylinder 120 can have the embodiment of the present disclosure as shown in FIG. 2 function identically to prior art as shown in FIG. 1.

Figure 3:
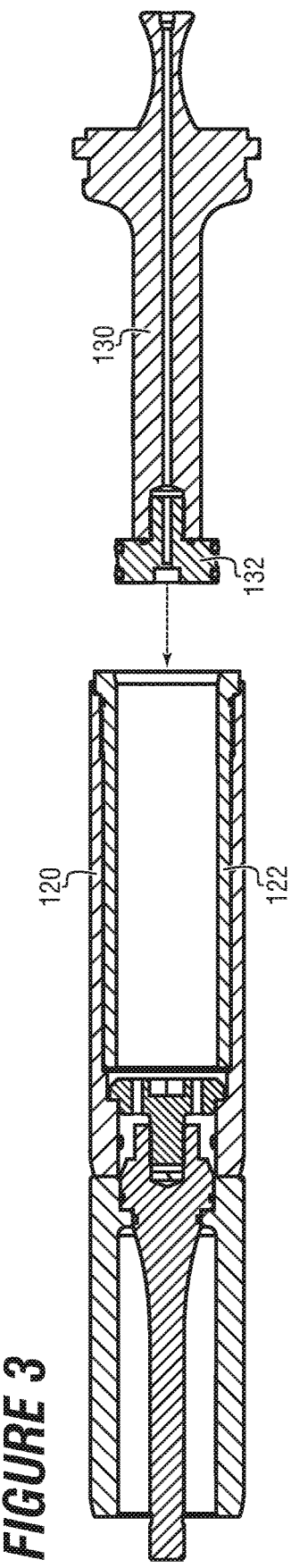
FIG. 3 depicts a traveling cylinder and a stationary plunger according to one or more embodiments.

FIG. 3 depicts a traveling cylinder and a stationary plunger according to one or more embodiments.

As can be seen, the stationary plunger 130 can be installed concentrically into the traveling cylinder 120 and the sleeve 122 without disconnection of the traveling cylinder 120 from the power end.

Figure 4:
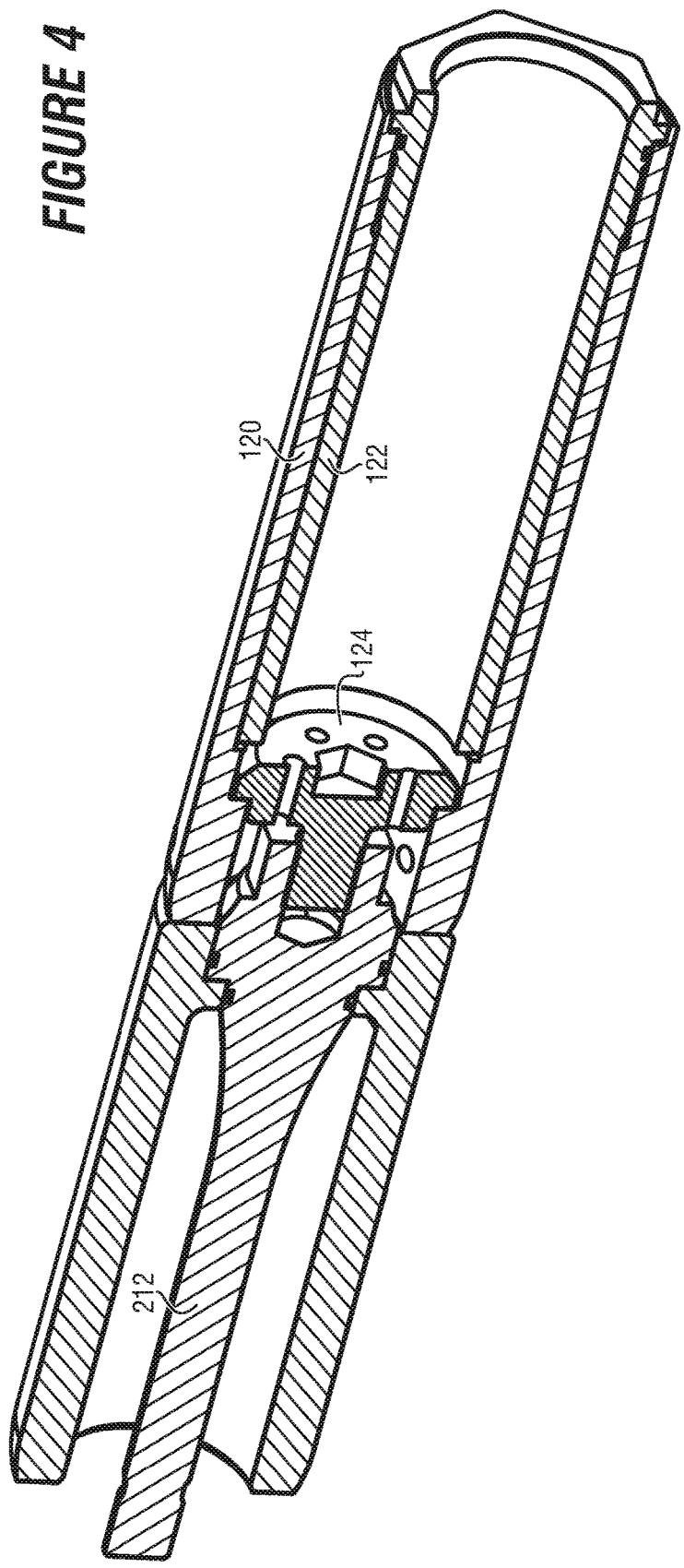
FIG. 4 depicts a cut view of the traveling cylinder according to one or more embodiments.

FIG. 4 depicts a cut view of the traveling cylinder and sleeve according to one or more embodiments.

Shown are pony tie rod 212, tie rod cap 124, traveling cylinder 120 and sleeve 122.

The presently disclosed embodiments allow users to have a great deal of flexibility heretofore unknown in the industry. An exemplary use case follows:

A contractor performing service work has a positive-displacement reciprocating pump that is configured with three plungers, commonly referred to as a triplex pump. The pump comprises five-inch plungers and is capable of producing 10,000 pounds of pressure at a flow rate of two and a half barrels per minute. The client of the contractor, however, requires a pressure of 14,000 pounds at a flow rate of two and a half barrels per minute.

In order to meet the service requirements, a triplex pump comprising three and a half inch plungers is required. Using a prior art device, an entirely different pump must be utilized, or the fluid end of the pump replaced to be able to meet the new requirements.

With an apparatus of the present disclosure, however, the contractor can simply replace the liner and the stationary plunger to meet the new flow and pressure requirements. The replacement saves several hours of time and labor required and does not require the fluid end to be detached from the drive mechanism. Overall, this results in cost savings by at least a factor of four and allows for greater utilization of equipment without loss of service time.

While the present disclosure emphasizes the embodiments, it should be understood that within the scope of the appended claims, the disclosure might be embodied other than as specifically described herein.

What is claimed is:

1. A plunger and cylinder assembly for a fluid end of a reciprocating pump comprising:
   a. a traveling cylinder securable to a thrust component of a power end;
   b. a stationary plunger comprising a plunger shaft and a plunger head positioned concentrically within the traveling cylinder; and
   c. a sleeve detachably secured to the traveling cylinder, wherein the inner diameter of the sleeve receives the plunger head; and
   wherein the traveling cylinder is displaceable along its axis by the thrust component of the power end when secured to the thrust component, and further wherein the sleeve and the plunger head act cooperatively to create a change in pressure within the fluid end of the reciprocating pump when the traveling cylinder is displaced.

2. The assembly of claim 1, wherein the traveling cylinder is secured to the thrust component with a threaded cap or a clamp.

3. The assembly of claim 1, wherein the stationary plunger is secured to a housing of the fluid end.

4. The assembly of claim 1, wherein the plunger head is detachable from the plunger shaft.

5. The assembly of claim 1, wherein the outer diameter of the plunger head is substantially identical to the inner diameter of the sleeve in any given radial plane.

6. The assembly of claim 1, wherein the sleeve is detachable from the fluid end of the reciprocating pump without detaching the traveling cylinder from the thrust component or detaching the fluid end from the thrust component.

7. The assembly of claim 1, wherein the sleeve has an inner diameter ranging from 0.250 inches to 8.000 inches.

8. The assembly of claim 1, wherein the plunger head has an outer diameter ranging from 0.250 inches to 8.000 inches.

9. The assembly of claim 1, wherein a contact area between the plunger head and the sleeve comprises a seal.

10. The assembly of claim 9, wherein the stationary plunger comprises a fluid pathway for providing lubricant to the seal.

11. A method of retrofitting a reciprocating pump comprising:
   a. removing a plunger from a reciprocating pump fluid end and replacing the plunger with a traveling cylinder;
   b. securing a sleeve with a desired inner diameter to the traveling cylinder; and
   c. removing a cylinder head plug from the reciprocating pump fluid end and replacing the cylinder head plug with a stationary plunger comprising a plunger head with an outer diameter to match an inner diameter of the sleeve.

12. A method of optimizing reciprocating pump performance comprising:
   a. providing a reciprocating pump fluid end comprising a traveling cylinder, a sleeve, and a stationary plunger;
   b. detaching and removing the stationary plunger;
   c. detaching and removing the sleeve from the traveling cylinder;
   d. attaching a selected sleeve with a desired inner diameter for desired performance characteristics; and
   e. selecting and attaching the stationary plunger comprising a plunger head with a matching outer diameter for the selected sleeve or, alternatively, replacing the plunger head of the stationary plunger with a plunger head having a matching outer diameter for the selected sleeve and attaching the stationary plunger.

13. The method of claim 12, further comprising: varying the speed of a driver of the reciprocating pump fluid end for desired performance characteristics.

\* \* \* \* \*